Patented Oct. 10, 1950

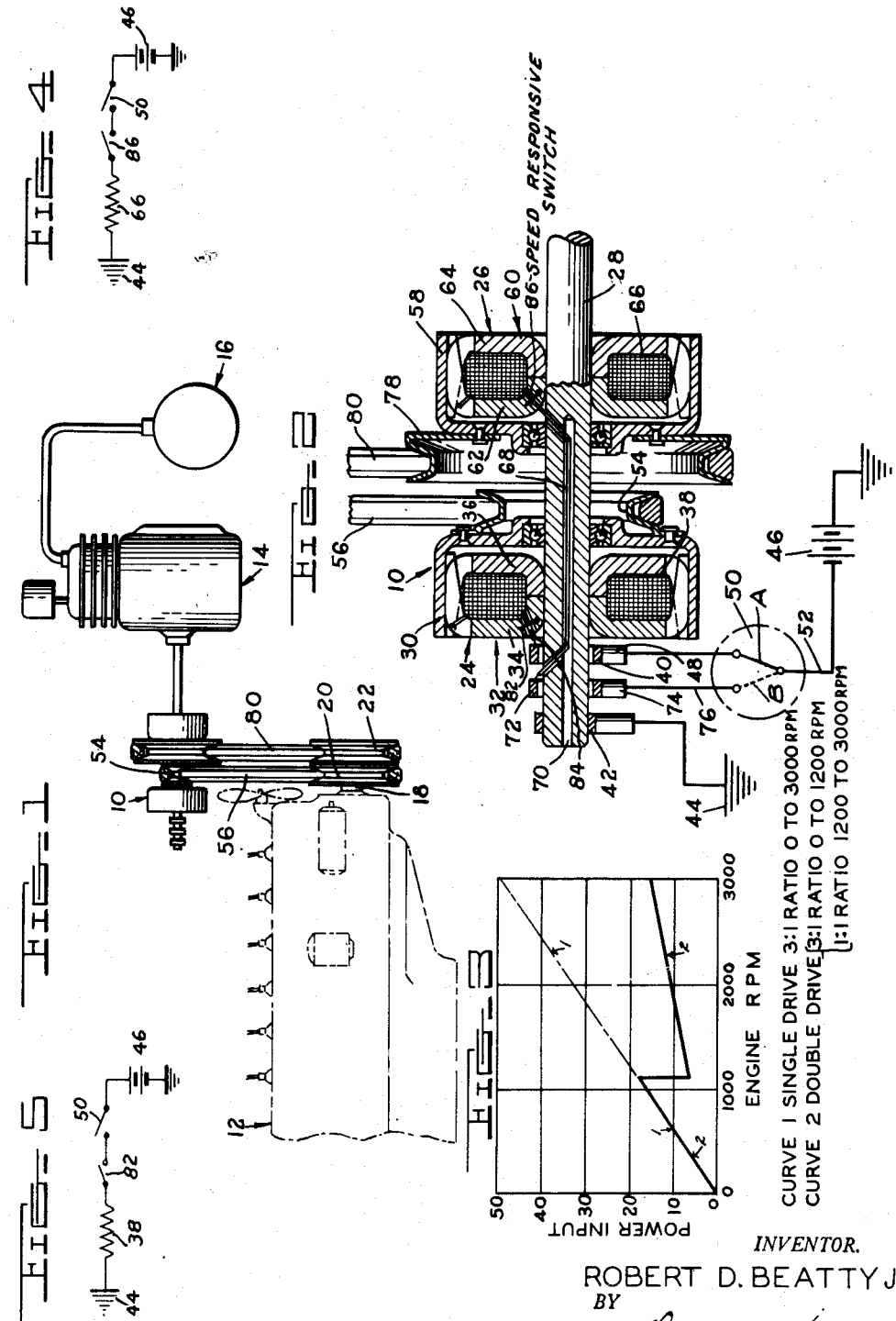

2,525,579

UNITED STATES PATENT OFFICE 2,525,579

MAGNETIC DRIVE

Robert D. Beatty, Jr., Shaker Heights, Ohio, assignor to Eaton Manufacturing Company, Cleveland, Ohio, a corporation of Ohio Application August 30, 1946, Serial No. 694,109

7 Claims. (Cl. 172—284)

This invention relates to speed differential transmitting apparatus and more particularly to eddy current electromagnetic apparatus for said purpose.

Broadly the invention comprehends the provision of a selective speed ratio electromagnetic apparatus incorporating a pair of electromagnetic controllable speed or speed differential transmitting devices arranged with respect to one another and power input and output members therefor, effective through suitable controls to deliver a predetermined substantially constant speed output for a wide range of speed input.

Heretofore, in the operation of air compressors and like mechanism driven from a variable speed engine or other variable speed prime mover, it has been impossible to maintain these mechanisms at ideal operating conditions of substantially constant speed for widely varied ranges of speed of the prime mover with the consequence that the driven mechanisms, such as compressors, have had to be made of a size far in excess of requirements or have failed prematurely by being operated at speed ranges beyond requirements for prolonged periods of time. The instant invention through the provision of electromagnetic controllable speed transmitting apparatus as a coupling medium between variable speed prime movers, and compressors and the like provides means for effectively controlling the predetermined substantially constant speed requirements of said compressors and the like regardless of the extended speed range of variable speed prime movers as drive means therefor.

An object of the invention is the provision of a speed differential transmitting apparatus for converting variable speeds delivered thereto into substantially constant output speeds.

Another object of the invention is the provision of an electromagnetic speed differential transmitting apparatus for effectively driving air compressors and like devices at a predetermined rated speed wherein the drive is derived from a variable speed prime mover.

A further object of the invention is the provision of an electromagnetic speed differential transmitting apparatus capable of converting variable speed characteristics of conventional automotive engines to substantially constant speed through the novel arrangement of a pair of electromagnetic controllable speed transmitting devices arranged for operation either in successive or in overlapping relation and the provision of suitable controls for controlling the operation of the devices.

Other objects and advantages of the invention will appear from the following description taken in connection with the drawings, forming a part of the specification; and in which:

Fig. 1 is a plan view of an electromagnetic speed differential transmitting apparatus, constituting the invention, in associated relation with a variable speed input engine and an air compressor driven thereby;

Fig. 2 is a vertical cross sectional view of the magnetic power transmitting mechanism;

Fig. 3 is a power input-engine R. P. M. graph;

Fig. 4 is a schematic illustration of the electrical control circuit for one of the coils of the apparatus; and Fig. 5 is a schematic illustration of the electrical control circuit for the other coil of the apparatus.

The present invention was devised to supply the demand for means capable of converting the output of variable speed engines to substantially constant speed for the operation of devices such as air compressors requiring for maximum efficiency and economy to be operated at a predetermined substantially constant speed in accordance with desired requirements. By the novel arrangement as taught herein of a pair of electromagnetic controllable speed transmitting devices controllable to a substantially constant output speed irrespective of the input speed delivered thereto within predetermined limits, it has become possible to provide for the operation of air compressors associated with automotive engines or other similar prime movers at a predetermined desired substantially constant speed for all normal operating ranges of speed of the prime mover supplying the motive force to the compressor.

The utilization of a pair of eddy current electromagnetic controllable speed transmitting devices of the variable input substantially output speed controlled type arranged for successive or overlapping operation as evidenced by this invention permits of the operation of mechanism to be driven thereby at a predetermined required substantially constant speed for all operating speeds of conventional vehicle engines between idling and maximum speeds which are delivered to either one device or the other.

The speed differential transmitting apparatus herein devised comprises a pair of eddy current electromagnetic controllable speed transmitting devices, each having independent input members, but only one common output member wherein the input members are driven at different speed ratios from the variable speed source relative to one another such that at a predetermined speed input one of the devices is progressively disengaged while simultaneously therewith, the other drive is progressively engaged thereby permitting of the controlled substantially constant output speed of the output member for a wide input speed range. Suitable controls are provided for controlling the energization of the electromagnetic devices in accordance with the engine R. P. M. so that the speed delivered to the mechanism to be operated thereby remains substantially constant without interruption regardless of which device is in operation or at what speed the variable speed prime mover is driving.

Referring to the drawings for more specific details of the invention, 10 represents generally an electromagnetic speed differential transmitting apparatus arranged to transmit motion from a variable speed engine 12 to an air compressor 14 having an air storage tank 16 connected therewith. The engine is provided with a power take-off shaft 18 mounting and having splined thereto a pair of identical sheaves or pulleys 20 and 22 respectively.

The speed differential transmitting apparatus 10 includes a pair of similar electromagetic controllable speed transmitting devices or drives 24 and 26 arranged for either series or overlapping operation and having a single output shaft 28 constituting the input operational shaft of the compressor 14. The devices 24 and 26 are of the type illustrated and broadly defined by U. S. Patent No. 2,367,163, issued to Martin P. Winther.

The device 24 comprises a drum member 30 journaled on shaft 28 and a cooperating rotor 32 mounted and fixedly secured upon the shaft 28 internally of the drum 30.

The rotor 32 consists of a pair of identical annular members 34 and 36 of cross sectional U-shape fixedly mounted in adjacent relation upon shaft 28 providing therebetween an annular space for the reception of a ring shaped energizing coil 38. The members 34 and 36 forming a field body of the transmitting device 24 are each provided with pole arms axially extended in alternately overlapping relation externally of the coil 38, said arms at their periphery being spaced from the internal surface of the drum by a predetermined amount sufficient to permit of free running between the pole arms and drum.

One end of coil 38 is connected to a slip ring 40 mounted upon shaft 28 and has its other end grounded through connection with annular member 34 back through shaft 28, thence through a slip ring brush arrangement 42 to the ground 44. The slip ring 40 is connected to any suitable electrical power source such as a storage battery 46 by way of contact brush 48 and control switch 50 forming a part of an electrical circuit 52.

The drum 30 has fixedly secured thereto a pulley or sheave 54 which in turn is connected by a V-belt 56 to pulley 20 of the engine power take-off shaft, said pulley 54 providing with pulley 20 a multiple drive ratio for the device 24 over the engine R. P. M.

The device 26 is of similar construction as the device 24 and comprises a drum member 58 journaled on shaft 28 and a cooperating rotor 60 mounted and fixedly secured upon the shaft 28 internally of the drum 58. The rotor 60 consists of a pair of identical annular members 62 and 64 of cross sectional U-shape fixedly mounted in adjacent relation upon shaft 28 and providing therebetween an annular space for the reception of a ring shaped energizing coil 66. The annular members 62 and 64 forming the field body of the device 26 are each provided with pole arms axially extended in alternately overlapping relation externally of the coil 66, said arms at their periphery being spaced from the internal annular surface of the drum 58 by a predetermined amount similarly as in device 24. It is to be noted that the drum and rotor arrangements of the respective devices 24 and 26 are of similar construction aside from the fact that the drums 30 and 58 are arranged in opposed relationship relative to their respective rotors.

The coil 66 has one end connected through switch 50 to the battery 46 by way of electrical conduit 68 supported in a bore 70 in shaft 28, a slip ring 72 supported on shaft 28, and contact brush 74 having a lead wire 76 connected to the switch 50.

The drum 58 of device 26 has affixed thereto a pulley or sheave 78 which in turn is driven from pulley 22 by a V-belt 80 connected therebetween. The pulleys 22 and 78 provides for either a 1 to 1 ratio drive or an under drive of the drum relative to the output speed depending upon the requirements demanded of the speed differential transmitting apparatus as a unit for maintaining substantially constant output speed with a predetermined allowable speed differential or slip between the input to and output from the speed differential transmitting mechanism. The electrical contact brushes 48 and 74 respectively for supplying current to the drives 24 and 26 are so connected relative to switch 50 that only one drive can be fully energized at a time, thus providing for a continuous uninterrupted successive operation of the speed differential transmitting apparatus 10 through the operation of either one device or the other depending upon the demands placed upon the apparatus as controlled by the switch 50. It is preferably desired in controlling or changing over from one device to another that they both remain energized simultaneously for a limited period of time until either one device or the other takes over completely at which time the other is de-energized. The switch 50 although shown as a simple two place switch is preferably adapted to be automatically actuated in accordance with the requirements of the speed differential transmitting apparatus as determined by the output speed of the variable speed engine supplying motive force for the operation of the air compressor 14 or whatever other mechanism that is adapted to be driven therefrom.

The graph shown by Fig. 3 illustrates a typical example of application of speed differential transmitting apparatus 10 wherein the prime mover or engine ranges in speed from its initial starting speed to that of 3,000 R. P. M., whereas the power input to the speed differential transmitting apparatus varies from 0 to approximately 17 H. P. at 1,200 R. P. M. upon the operation of the multiple ratio driven electromagnetic device 24 and upon the switching over to the 1 to 1 ratio or underdrive driven electromagnetic device 26 the power input thereto various approximately between 6.5 H. P. and 15 H. P. corresponding with an engine R. P. M. between 1,200 and 3,000 R. P. M. While it is possible to obtain a substantially constant speed output from a single electromagnetic device such as either device 24 or 26 for a limited speed range, the arrangement herein presented permits of a substantially constant speed output through shaft 28 for all speeds of engine 12 from an idling speed of approximately 400 R. P. M. to 3,000 R. P. M., while at the same time establishing a predetermined permissible speed loss or differential between the input speed to the apparatus and the speed delivered thereby. If either one or the other of devices 24 or 26 was to be used independently and in this case 24 continued in operation for all speeds of the engine, the speed differential or slip necessary between the drum 20 and rotor 32 to maintain a substantially constant speed of the rotor at approximately 1,200 R. P. M. would have to vary from 0 to 7,800 R. P. M. thereby causing excessive heat as represented by the power output by the engine at 3,000 R. P. M. as indicated by curve 1. For example purposes here given, the drive 24 is driven in the ratio of 3 to 1 compared to the engine R. P. M. and drive 26 is driven at a 1 to 1 or direct speed ratio to the engine output speed. The curve 2 as shown by the graph represents specifically the successive operation of the drives wherein a two place switch 50 of the type shown by the drawing is employed and wherein one drive takes over as the other is deenergized at 1,200 R. P. M. It is obvious that should there be an overlapping of operation of the drives as might be desired in the automatic switching control thereof there would not be a decided drop off at 1,200 R. P. M. as is the case in the distinct successive operation of the drives.

It is to be understood that any variation of ratio of drive between the respective device and engine may be made depending upon the requirements or limitations of allowable speed differential or loss.

In a normal operation of speed differential transmitting apparatus 10 with the engine 12 operating at an idling speed of say 400 R. P. M., the switch 50 is placed or automatically moved to the full line position A providing for energization of the coil 38 thereby effecting operation of the shaft 28 in the order of substantially 1,200 R. P. M. wherein the drum 20 is being driven at the ratio of 3 to 1 as determined by the comparative ratios established between pulleys 20 and 54 and the coil 38 is fully energized thereby effecting a substantially 1 to 1 drive between the drum and rotor. During this period of operation, the output shaft 28 of the speed differential transmitting apparatus continues to rotate at 1,200 R. P. M. through the medium of device 24 for the operation of air compressor 14 even as the variable speed engine 12 varies in speed from idling at 400 R. P. M. to a speed of 1,200 R. P. M. It is to be realized that the maintenance of a substantially constant output speed of shaft 28 is obtained through the controlled energization of coil 38 in accordance with changes in the engine R. P. M. effective to provide for the varying of relative speed between drum 30 and rotor 32. The energization control of coil 38 is effected through the utilization of an electric current make and break governor switch 82 arranged in the electrical current conducting line 84 intermediate coil 38 and slip ring 40 and is mounted for rotation with rotor 32. The governor switch 82 is normally closed and set for deenergization control of the coil 38 when the rotor attains a speed of 1,200 R. P. M. as driven through the operational rotation of drum 30. The switch 82 is effective to maintain a substantially constant rotation of the rotor 32 and shaft 28 once the rotor attains a speed of 1,200 R. P. M. even though the speed of the drum 30 as driven by pulley 56 varies between 1,200 and 3,600 R. P. M. With the switch 50 set for automatic operation in accordance with the engine speed at 1,200 R. P. M. thereof, the switch will move to the dotted line position B, thus operating to effect decreased energization of the device 24 as it simultaneously operates to complete the circuit for the full energization of coil 66 of device 26. Upon the full energization of coil 66 of device 26 and the taking over of complete operation by device 26, the coil 38 is de-energized and device 24 ceases to function and the rotation that is imparted to drum 58 in the ratio of 1 to 1 as determined by the ratio between pulleys 22 and 78 effects rotation of rotor 60 and shaft 28 for the rotation thereof at 1,200 R. P. M. similarly as provided for through the operation of device 24. The device 26 will continue to be effective to transmit driving motion from the engine to the compressor from speeds ranging from 1,200 R. P. M. to a maximum engine speed of 3,000 R. P. M., as illustrated by the graph, during which range of speed the shaft 28 will continue to output substantially 1,200 R. P. M. as effected by controlled energization of coil 66 in accordance with the engine speed variation between 1,200 and 3,000 R. P. M., thus with the cooperative operation of devices 24 and 26 the air compressor 14 will be continually operated at a substantially constant speed throughout the normal operating speed range of the engine from idling to maximum speed without an excessive generation of heat and consequently power loss as would be the case if only one device were employed. Coil 66 is controlled for energization to maintain a substantially constant output speed of rotor 60 and shaft 28 at 1,200 R. P. M. by an electric current make and break governor switch 86 mounted for rotation on rotor 60 and arranged in electrical conduit 68 intermediate slip ring 72 and coil 66. The governor switch is comparable to switch 82 for coil 38 operable to control the energization and deenergization of coil 66 once the speed of the rotor 60 has attained 1,200 R. P. M. to thereby maintain the speed of the rotor 60 and shaft 28 substantially constant at 1,200 R. P. M. as the drum 58 varies in speed between 1,200 and 3,000 R. P. M. as driven by pulley 80 from engine 12.

The switches 82 and 86 as employed for the energization and deenergization control of the respective coils 38 and 66 are of the conventional centrifugal speed responsive type operable to make and break contact of the circuit within which they are employed for the controlled flow of electrical current therethrough in accordance with their established setting for the desired substantially constant speed output control of rotors 32 and 60 and shaft 28 connected jointly thereto.

By utilizing the devices 24 and 26 in series, the speed differential or loss between that delivered to the speed differential transmitting apparatus is held to a permissible minimum, while at the same time affording the necessary requirements of operation for the air compressor 14.

It is readily conceivable that should it be desired to operate over wider speed ranges than those herein recited it would merely require the arrangement of additional drives similar to drives 24 and 26 in a similar manner thereto and operate them through similarly suitable pulley ratios and in either successive or overlapping relation.

The power transmitting mechanism 10 although specifically shown and described in association with the operation of an air compressor is susceptible of application to any and all devices requiring for the most efficient and economical operation thereof a substantially constant speed wherein said devices are adapted to be driven from a variable speed source and is therefore to be limited only as indicated by the scope of the appended claims.

What I claim is:

1. A speed differential transmitting apparatus comprising an electromagnetic speed differential drive having a variable speed input member and a controllable substantially constant speed output member above a predetermined speed of the input member, a second electromagnetic speed differential drive having a variable speed input member and a controllable substantially constant speed output member above a predetermined speed of input member, an output shaft common to the output members of both drives, electromagnetic coils carried by one of the members of each drive, means for energizing the coils and means for controlling the energization of the coils effective to provide for a controlled operation of the drives.

2. An apparatus for transmitting a variable speed delivered thereto into a substantially constant speed comprising an electromagnetic drive having a variable speed driven input member and a controllable substantially constant speed output member, a second electromagnetic drive of equal capacity as the other drive having an input member adapted to be driven at a variable speed similarly to the input member of the other drive and an output of the same controllable substantially constant speed as the other drive, a member common to the output members and driven thereby, magnetic coils carried by the drives, means for energizing the coils and means for controlling the energization of the coils effective to provide for successive operation of the drives and a controlled substantially constant speed output of the member driven by the output members of the drives.

3. An electromagnetic speed differential transmitting apparatus adapted to be driven from a variable speed prime mover comprising an electromagnetic controllable speed transmitting device having a variable speed driven input member and an output member controllable to substantially constant speed within predetermined limits, a second electromagnetic controllable speed differential device having an input member adapted to be driven at a variable speed operable independently of the input member of the other device and an output member operable at a constant speed substantially identical to the speed of the output member of the other device, an output shaft fixedly secured respectively to the output members of both devices, and means for controlling the operation of the devices.

4. A speed differential transmitting apparatus comprising a plurality of eddy current electromagnetic drives each having cooperable input and output members, a variable speed prime mover for driving the input members of the drives, an output shaft fixedly connected to the output member, variable speed ratio means connecting the prime mover to the respective drives and means for controlling the drives for the successive operation thereof providing for the substantially constant speed output of the output shaft above predetermined input speeds to the input members.

5. A speed differential transmitting apparatus comprising a plurality of electromagnetic power transmitting drives of the variable input, controllable output speed type each including an input member, an output member and an energization control electromagnetic coil, an output shaft directly connected to the output members of the respective drives, and means for controlling the successive energization of the drives for the substantially constant speed control of the output shaft above a predetermined variable input speed of the input members of the drives.

6. A speed differential transmitting apparatus comprising a plurality of electromagnetic power transmitting drives of the variable input, controllable output speed type each including an input member, an output member and an energization control electromagnetic coil, an output shaft directly connected to the output members of the respective drives, variable speed ratio means adapted to be driven by a single prime mover affixed to the respective input members, and means for controlling the successive energization of the drives for the substantially constant speed control of the output shaft above a predetermined variable input speed of the input members of the drives.

7. A speed differential transmitting apparatus comprising a pair of similar electromagnetic drives, each drive comprising a variable speed driven input member, a controllable substantially constant speed output member associated with the input member and an electromagnetic coil arranged on one of the members, means for energizing the coils, means for controlling the energization of the coils for the successive operation of the drives, means coupling the output members of the drives together, and means coupling the input members to a source of power for the driving thereof over different speed ranges.

ROBERT D. BEATTY, Jr.

REFERENCES CITED

The following references are of record in the file of this patent:

UNITED STATES PATENTS

| Number | Name | Date |
|---|---|---|
| 744,423 | Steckel | Nov. 17, 1903 |
| 1,265,078 | Grote | May 7, 1918 |
| 2,114,835 | Fouquet | Apr. 19, 1938 |
| 2,120,352 | Ericson | June 14, 1938 |
| 2,286,778 | Winther | June 16, 1942 |
| 2,357,516 | Jacobs | Sept. 5, 1944 |
| 2,367,163 | Winther | Jan. 9, 1945 |